US006968517B2

(12) United States Patent
McConaghy

(10) Patent No.: US 6,968,517 B2
(45) Date of Patent: Nov. 22, 2005

(54) METHOD OF INTERACTIVE OPTIMIZATION IN CIRCUIT DESIGN

(75) Inventor: Trent Lorne McConaghy, Ottawa (CA)

(73) Assignee: Synopsys Inc., Mountain View, CA (US)

( * ) Notice: Subject to any disclaimer, the term of this patent is extended or adjusted under 35 U.S.C. 154(b) by 179 days.

(21) Appl. No.: 10/289,403

(22) Filed: Nov. 7, 2002

(65) Prior Publication Data

US 2003/0093763 A1 May 15, 2003

Related U.S. Application Data

(60) Provisional application No. 60/331,031, filed on Nov. 7, 2001.

(51) Int. Cl.[7] ......................... G06F 17/50; G06F 9/455; G06N 3/00
(52) U.S. Cl. ................... 716/2; 716/4; 716/11; 706/13; 706/921; 703/13
(58) Field of Search ............................. 716/1–2, 4, 11, 716/18; 706/13, 919–921; 703/13, 14

(56) References Cited

U.S. PATENT DOCUMENTS

| | | | | |
|---|---|---|---|---|
| 5,867,397 A | * | 2/1999 | Koza et al. ................... 703/14 |
| 6,004,015 A | * | 12/1999 | Watanabe et al. ............. 700/28 |
| 6,625,785 B2 | * | 9/2003 | Chatterjee et al. ............. 716/4 |
| 6,637,008 B1 | * | 10/2003 | Higuchi et al. ................ 716/2 |

OTHER PUBLICATIONS

K. J. Antreich et al., "An Interative Optimization Technique for the Nominal Design of Integrated Circuits," IEEE Trans. on Circuits and Systems, vol. CAS-31, No. 2 Feb. 1984, pp. 203-212.*

K. J. Antreich et al., "Nominal Design of Interated Circuits on Circuit Level by and Interactive Improvement Method," IEEE Trans. on Circuits and Systems, vol. 35, No. 12, Dec. 1988, pp. 1501-1511.*

M. G. R. Degrauwe et al., "IDAC: An Interactive Design Tool for Analog CMOS Circuits," IEEE Journal of Solid-State Circuits, vol. SC-22, No. 6, Dec. 1987, pp. 1106-1116. *

M. G. R. Degrauwe et al., "Towards an Analog System Design Environment," IEEE Journal of Solid-State Circuits, vol. 24, No. 3, Jun. 1989, pp. 659-671.*

J. Jongsma et al., "An Open Design Tool for Analog Circuits," IEEE Int'l Symposiumon Circuits and SYstems, Apr. 1991, pp. 2000-2003.

(Continued)

*Primary Examiner*—Leigh M. Garbowski
(74) *Attorney, Agent, or Firm*—Bever, Hoffman & Harms, LLP; John M. Kubodera

(57) ABSTRACT

A method of interactively determining at least one optimized design candidate using an optimizer, the optimizer having a generation algorithm and an objective function, the optimized design candidate satisfying a design problem definition, comprises generating design candidates based on the generation algorithm. The generated design candidates are added to a current set of design candidates to form a new set of design candidates. The design candidates are evaluated based on the objective function so that design candidates can be selected for inclusion in a preferred set of design candidates. The current state of the optimizer is presented to a designer for interactive examination and input is received from the designer for updating the current state of the optimizer. These steps are repeated until a stopping criterion is satisfied.

9 Claims, 13 Drawing Sheets

OTHER PUBLICATIONS

W. Nye et al., "DELIGHT.SPICE: An Optimization-Based System for the Design of Integrated Circuits," IEEE Trans. on Computer-Aided Design, vol. 7, No. 4, Apr. 1988, pp. 501-519.

E. Polak et al., "DELIGHT.MIMO: An Interactive, Optimization-Based Multivariable Control System Design Package," Dec. 1982 IEEE Control Systems Magazine, pp. 9-14.

Nye et al., "DELIGHT: An Optimization-Based ComputerAided Design System," 1981 IEEE Int'l Symposium on Circuits and Systems, pp. 851-855.

Antreich et al., "A New Approach to the Design of Integrated Circuits by Interactive Optimization," 1982 Int'l Symposium on Circuits and Systems, pp. 1172-1175.

* cited by examiner

|           | Example 1 | Example 2 | Example 3 |
|-----------|-----------|-----------|-----------|
| Schematic | Manual    | Automatic | Automatic |
| Size      | Automatic | Automatic | Automatic |
| Place     | Manual    | Automatic | Manual    |
| Route     | Manual    | Automatic | Manual    |
| Extract   | Automatic | Automatic | Automatic |
| Verify    | Manual    | Manual    | Manual    |

Figure 8

METHOD OF INTERACTIVE OPTIMIZATION IN CIRCUIT DESIGN

The present application claims the benefit of convention priority from U.S. provisional patent application No. 60/331,031 filed on Nov. 7, 2001.

FIELD OF THE INVENTION

The present invention relates to electronic design automation (EDA) and particularly to circuit design.

BACKGROUND OF THE INVENTION

The present invention is directed to aiding a circuit designer in designing an AMS circuit that fits with his or her set of preferences for circuits.

The optimization of analog circuits can take place at different levels. Cells are transistor-level circuits with between approximately 5 and 50–200 components, such as operational amplifiers. An analog cell is an elementary circuit that performs some useful function. It consists of a set of components connected together in a carefully constructed topology. Each of these components may have designable values such as resistance, capacitance, length, width or area.

There is value in the design of analog circuits with complexity greater than cells, such as active filters and phase-locked-loops. An active filter, for example, consists of several operational amplifiers connected together as sub-circuits. The design space for such complex circuits is ultimately the interconnection, sizing and layout of all the components at the finest level of granularity.

One can attack the design of complex circuitry in one of two ways: flat or hierarchical. In the flat approach, we would attempt to manipulate all the designables at the finest level of granularity, all at once.

The hierarchical approach breaks up the system into smaller, more tractable sub-blocks. Those sub-blocks may get broken up, and so on, until the finest level of granularity is approached. This breaks up the big problem into a series of smaller, more tractable problems. A design methodology is then employed to solve each of the smaller subproblems until the final big problem has been solved. One example of such a methodology is the top-down constraint-driven design methodology, in which each subcircuit at each level of the hierarchy is separately designed. Another example is the concurrent methodology, in which subcircuits at two or more levels are optimized concurrently.

For example, referring to FIG. 1, an example design problem could relate to designing a system 100 that has among its components an active filter 110 and a PLL or phase-locked loop 120. The design of the active filter could itself involve sub-components such as operational amplifiers denoted in FIG. 1 by opamp1 112 and opamp2 114.

Each of these entities, namely system 100, active filter 110, PLL 120, opamp1 112 and opamp2 114 of FIG. 1 is a node in the design hierarchy and is associated with a corresponding design problem.

Referring to FIG. 2, the basic set up of AMS design at one node in a design hierarchy includes setting up the problem definition 200 and biases 210 and then using these conditions to solve the topology design or selection, sizing, placement, routing, extraction and verification problem 220 resulting in sized schematics 230. By topology, we refer to the structure of a circuit in terms of how components are connected to each other.

Automated design can be accomplished via optimization, in which an optimizer traverses a design space getting feedback from measures of goals. In general, the goal of optimization is to speed the design process and/or get higher quality results. There are generally three types of ways that designer preferences can be taken into account in optimization:

before the optimization (a priori);
during the optimization (interactive); and
after the optimization is complete (a posteriori).

An a priori approach to AMS circuit optimization-based design is illustrated in FIG. 3. An example of an a priori approach to handling preferences is having the designer set weights for each objective or constraint before the optimization begins 310. The optimization is typically performed by an automatic optimization loop 320. Within automatic optimization loop 320, new designs are suggested 330. The designs are initially unevaluated by the optimizer 340 so the next step is to evaluate them 350. The resulting current state of the search 360 includes evaluated designs. If the search results 360 are satisfactory, based on one or more stopping criteria, then a final result 370 is produced, otherwise the loop repeats the step of suggesting or generating additional designs 330 for evaluation.

Typically, the optimization will be biased based on the weights. Once the final result is examined, the designer can change the problem definition and/or biases, and re-start the optimization.

Another example is to specify exact thresholds of feasibility for circuit performances a priori. This is also known as constrained optimization. The design goal would be for the circuit's performances to pass all feasibility thresholds. For example, a simple amp might have two feasibility thresholds: "power consumption <50 mW" and "open loop gain>10 dB."

Some problems with an priori approaches include:
the designer does not know exactly what he wants before, because he does not know what designs are possible;
it may be difficult to express preferences in a natural manner;
the designer's preferences may change over time once he learns what is possible; and
because the preferences that the optimizer has been told may not align with what the designer actually wants or will want, the optimizer will return unwanted results.

An a posteriori approach to AMS circuit optimization based design is given in FIG. 4. An example of an a posteriori approach is for the optimizer to present a set of alternative designs 372 once it has completed optimization using automatic optimization loop 320, and for the designer to choose a design 380 as the final result 390.

A problem with such an a posteriori approach is that there may be so many possible objectives and constraints that the optimizer cannot possibly provide a full tradeoff among all of them within a reasonable amount of time. A problem with both the a priori and a posteriori approaches is that they may be unpalatable to designers who like to have more control of the design process, which means that opportunities for faster design via optimization are lost because the tool is not even used. Another problem with both approaches is that understanding of the design problem is somewhat compromised because the designer is no longer intimately involved with design "in-the-loop."

SUMMARY OF THE INVENTION

In automatic AMS circuit design, conventional approaches have no or limited interactive aspects of the optimization. There are many instances of a priori approaches, mostly based on a designer's changes to weights. There are a few examples of a posteriori approaches, mostly based upon multi-objective optimization. Interactive optimization approaches to AMS circuit design are, however, unknown.

For example, referring to the a priori approach of FIG. 1, the only "interactive" part of the optimization is that the designer can decide to stop the optimization based on the feedback received. Referring to the a posteriori approach illustrated in FIG. 4, the only "interactive" part of the optimization is that the designer may decide to stop the optimization based on the feedback received. These are not truly interactive in the sense that the designer cannot meaningfully modify the direction of the search and optimization process.

It is an object of the present invention to obviate or mitigate at least one disadvantage of previous methods associated with known methods of electronic design automation, particularly with respect to AMS design.

According to the present invention, an example of an interactive approach is for the designer to change the weights during the course of the optimization, based on feedback from the state of the optimization. Another example is to change the constraint feasibility thresholds during the course of the optimization.

The present invention is applicable to the solution of the design problem automated sizing tool at each node.

Things that the designer can change dynamically are:
1. Biases towards different regions; and
2. Changes in the problem definition itself In summary, the present invention is interactive optimization for AMS circuit design. While the optimizer is running, the designer can "steer" the optimizer to different regions based on feedback that has been presented to the engineer. The designer's decision making about what makes an optimal solution is intertwined with the optimization process itself.

In a first aspect, the present invention provides, in circuit design, a method of interactive AMS optimization, the method comprising: defining a problem to be solved; initiating optimization; presenting to a designer intermediate search results; interactively receiving input from the designer; and continuing the optimization as modified by input by the designer.

According to another aspect of the present invention, there is provided, a method of interactively determining at least one optimized design candidate using an optimizer, the optimizer having a generation algorithm and an objective function, the optimized design candidate satisfying a design problem definition, the method comprising: generating design candidates using the generation algorithm; adding the generated design candidates to a current set of design candidates to form a new set of design candidates; evaluating the design candidates in the new set of design candidates based on the objective function; selecting from the evaluated design candidates a preferred set of design candidates based on the objective function values of the design candidates; presenting a current state of the optimizer for interactive examination by a designer; receiving an input for updating the current state of the optimizer; updating the current state of the optimizer, based on the input interactively received for use in the next iteration; and iteratively repeating the previous steps until a stopping criterion is satisfied.

Advantages arise because the designer and the optimizer "collaborate" towards getting design(s) that the designer is satisfied with. An advantage of the present invention is that the design may be done more quickly or with less computational effort than with a non-interactive optimizer, e.g. by guiding it or by suggesting intermediate designs based on interactive feedback. Another advantage is that adoption of the tool is more palatable for skeptical designers because it lets the designer maintain "control", and that interactive optimization can be fun, as compared to a non-interactive optimizer. Another advantage is that the designer gets a greater understanding of the nature of the design problem, due to the "in-the-loop" feedback, which could have been lost in non-interactive optimizers. Another advantage of the present invention is that it allows a designer during optimization to decide to stop the optimization as soon as the desirable design is found based on the feedback received.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Embodiments of the present invention will now be described, by way of example only, with reference to the attached drawings, wherein:

FIG. 8 illustrates a table showing three different example implementations of the present invention;

DETAILED DESCRIPTION

Figure 1:
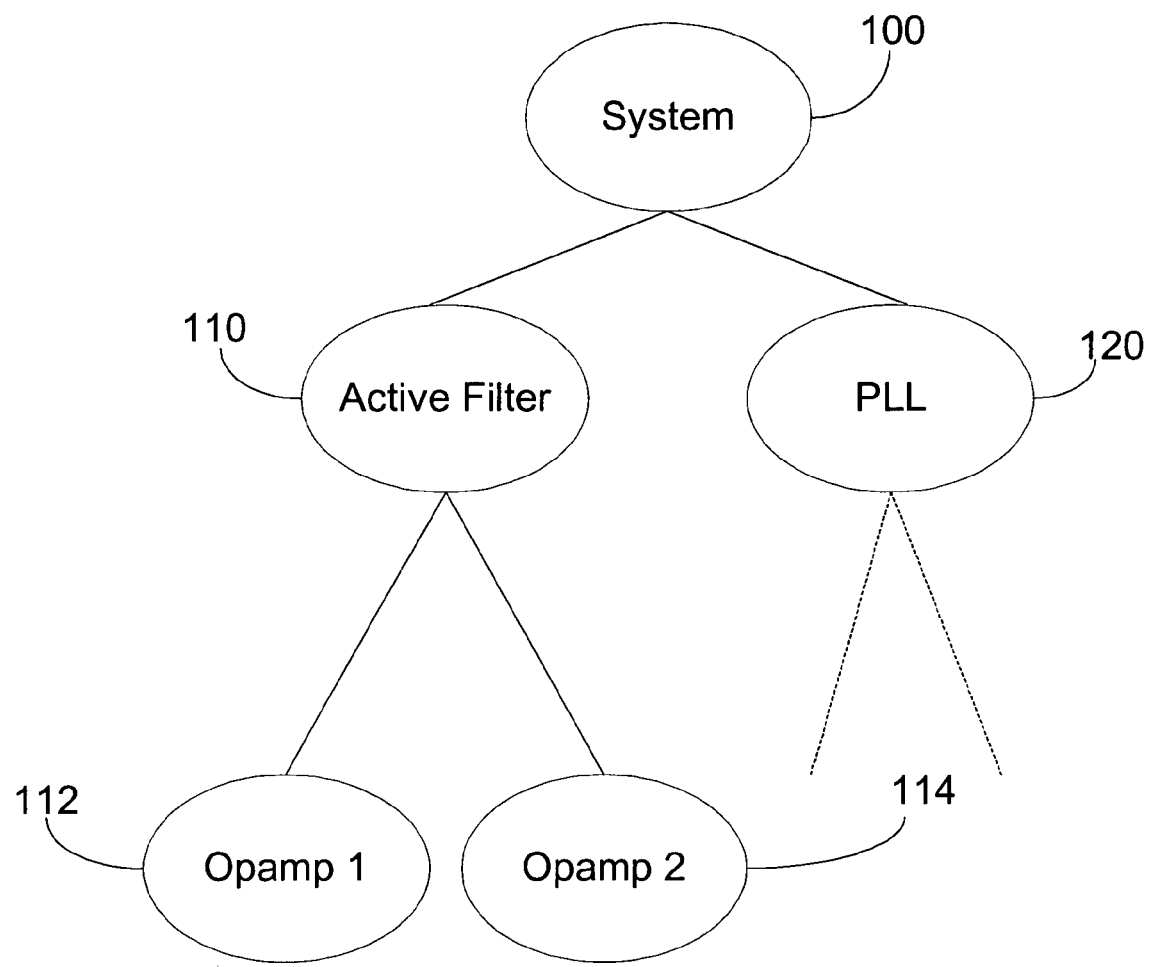
FIG. 1 illustrates an example of a design hierarchy.

The present invention relates to an interactive approach to AMS design.

In the description and claims the following terms are used. A design problem definition is the design space and goals and an objective function. An objective function is a means of taking in a design candidate and producing performance measures. Evaluation refers to the application of the objective function to design candidates. Goals refer to constraints and objectives. Constraints are conditions that must be met (e.g. open loop gain>40 db); objectives are conditions to improve as much as possible in light of constraints (e.g. maximize open loop gain). Biases are influences on the optimizer's generator and selector mechanisms. Design space is the set of all possible design candidates. A selector is a mechanism which compares two or more design candidates and selects some, typically using objective function values of the design candidates and biases. A generator is a mechanism which takes as input one or more design candidates and produces one or more new design candidates from those input design candidates. The generator can be a suitable generation algorithm (or its implementation), for example, standard mutation, crossover or Darwinian reproduction algorithms. The generator may have biases. An optimizer is a process which traverses a subset of the design space (the subset can include the entire design space) with the aim of identifying design candidates having the best or optimized objective function values. The expression "optimize" is used in a procedural sense of, for example, a search engine employing an optimizer, and not necessarily in an absolute or global sense. Accordingly, when a design is said to have been optimized, it is meant that a search has been conducted and the best results, according to specified criteria, have been identified. This does not, however, guarantee that other better results do not exist or that they cannot be found with additional searching. Current state of the search includes the best design candidates identified thus far.

A design candidate X is dominated by design candidate Y if each attribute evaluation criterion or performance score of X is less than a corresponding value of design candidate Y. Thus, if design candidate A has an open loop gain score of 1 and a power consumption score of 2, design candidate B has open loop score of 2 and power consumption score of 3 and design candidate C has open loop score of 3 and power consumption score of 1 then design candidate B dominates design candidate A but design candidate C does not. A design candidate is nondominated if no other design candidate dominates it. A tradeoff curve is a set of objective function values corresponding to the nondominated design candidates.

The expression "designer" generally refers to a person using the optimizer to determine one or more optimized design candidates and is generally synonymous with "user". It is not used restrictively to a high level designer such as an experienced electrical engineer although it can refer to such.

Figure 5:
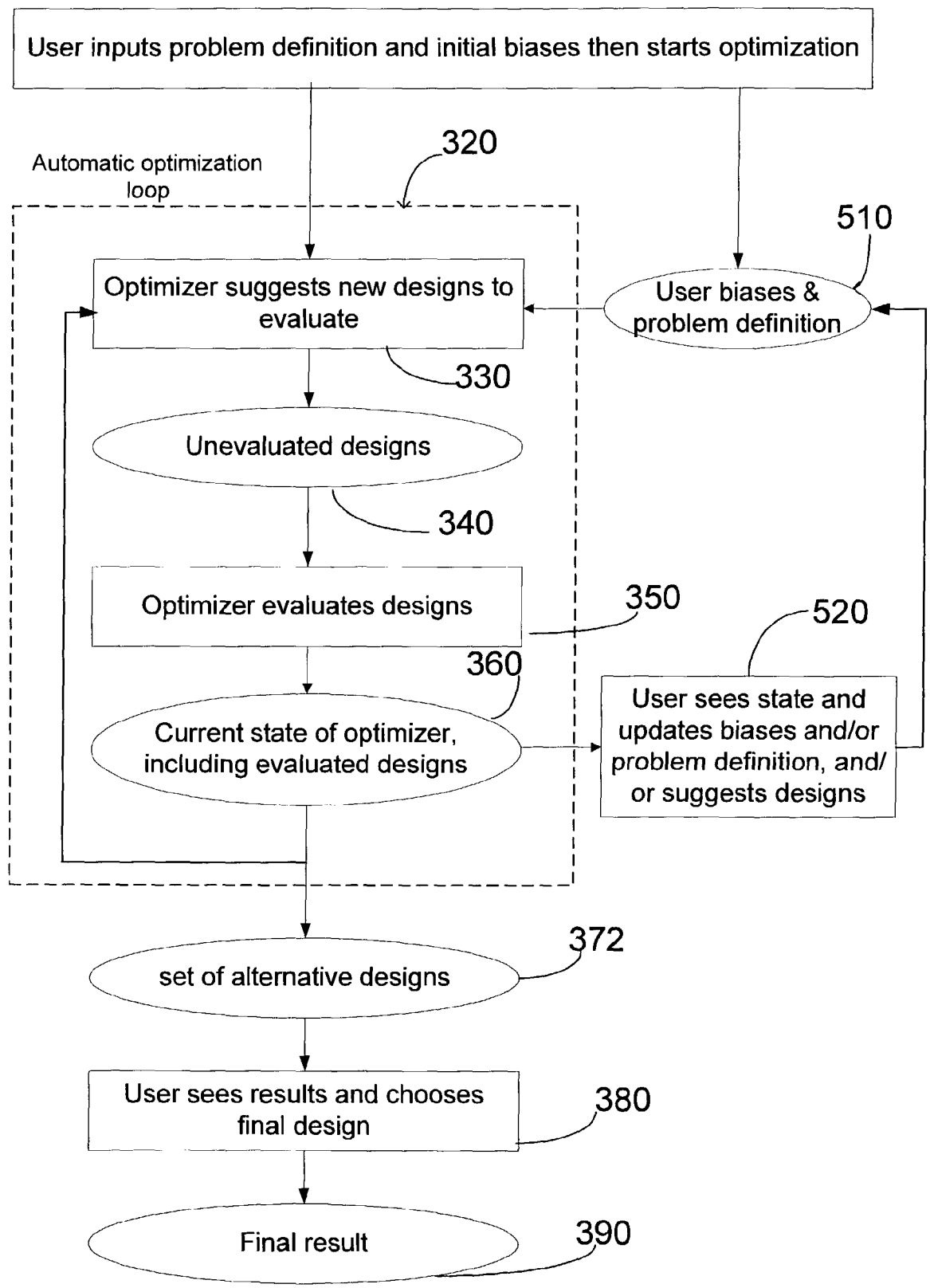
FIG. 5 illustrates an embodiment of the method of the present invention.

Referring to FIG. 5, according to an embodiment of the present invention, a method of interactive AMS optimization allows a designer (or user) to interact with an automatic optimization loop 320 to steer the direction of searching by introducing changes to the biases and problem definition 510 of the designs under consideration. The present invention is applicable to a wide variety of search algorithms. The search results can be presented to the designer in many different ways and the designer is afforded an opportunity to change the conditions under which the search is continued.

Referring to FIG. 5, the designer sets up the design problem 310 in the usual way by providing a problem definition and biases 510. The automatic optimization loop 320 is applied to the design problem. Within the automatic optimization loop 320, the optimizer uses the designer's biases and problem definition 510 to suggest new designs 330. These designs are added to any existing pool of designs such as ones suggested by the designer or ones available from another source such as a library of designs to form a set of unevaluated designs 340. The optimizer then uses a suitable function such as an objective function to evaluate the designs 350.

Typically, the evaluated designs will be used to select "winners" or preferred design candidates from the evaluated designs 350. Selection can be based on various techniques such as tournament selection or simply selecting the design candidates meeting certain criteria which includes high evaluation scores. The selected design candidates are then included in the current search results which is included in the state of optimizer 360 (which is discussed below). Other design candidates can also be included in the current search results, for example design candidates which were not selected because they were eliminated during tournament selection. Nonetheless, such design candidates may have strengths or attractive attributes recognized by the optimizer which complement the selected design candidates or which may be only slightly less important than the attributes emphasized during the selection process.

Another example of design candidates which may be included in the current search results are nondominated design candidates as discussed above.

The current state of the optimizer 360, including search results, is made available to the designer in a user-readable manner 520. The designer then has an opportunity to decide what modifications are desirable to steer or otherwise influence the search and optimization process. Note that although the information presented to the designer as "current state of the search" 360 includes the current search results, it can include any information which may be of interest to a designer in assessing the progress and integrity of the progress thus far and extrapolation of the process in future such as whether the search is converging, the difference in evaluation scores between the current search results and eliminated search results, how many conditions of the stopping criteria are satisfied, which possible directions of search remain to be explored and the results of the selection process.

Based on the current state of the optimizer 360, the designer then makes suitable modifications to affect future iterations in the automatic optimization loop 520. For example, as illustrated in FIG. 5 at reference 520, the designer can update biases or the problem definition so that the optimizer will work in a promising direction or avoid an undesirable region of search. The updated biases and/or problem definition 510 are available to the optimizer in the next iteration beginning with the generation of additional design candidates 330.

However, the dynamic intervention or interactive input by the designer is not restricted to modifications of biases and the problem definition (which includes goals and constraints). The designer can also, for example, modify the evaluation method by changing the objective function. Alternatively, the designer can choose a different selection process. A further option is to change the stopping criterion, including, of course to immediately halt the search if the results are satisfactory or further searching is futile or ineffective.

Furthermore, the designer can introduce additional designs into the optimization process 520, 530. The additional designs can be emphasized by their introduction into the current search results in preference to all other design candidates or with less emphasis by ensuring that they are considered during subsequent selection. The additional designs need not be few in number since entire classes of designs can be introduced by making available additional libraries of designs available to the optimizer as part of the population of designs for consideration.

The designer can also choose not to intervene and have the automatic optimization loop continue along its course for a specific number of iterations, or until a certain criterion is satisfied or for a particular amount of time or indefinitely (letting the automatic optimization loop run without any interference). This process of automatic optimization loop with interactive designer intervention continues iteratively until the designer terminates the process or the stopping criteria are satisfied. This process produces a set of design alternatives 372 for review and consideration by the designer. The designer is presented these results 372 in a suitable way such as by way of a tradeoff curve and chooses one or more final designs 380 as the final result 390.

The present invention is generally applicable to different search engine algorithms. The only requirements for the algorithm are that it is a search algorithm, and that it can be modified to accept some change in bias or in problem definition during the course of an optimization run. Accordingly, the present invention is applicable to many types of algorithms including: gradient-based search, hill-climbing algorithms, evolutionary algorithms, simulated annealing, tabu search, generalized pattern search, linear programming, sequential quadratic programming, and combinations thereof.

In order for a designer to interact with the search engine, the intermediate results or state of the search 360 must be presented to the designer. The only requirements of a presentation method or technique are that information is presented to the designer providing the designer with insight into the state of the search so that the designer to meaningfully change the biases and/or problem definition during the search. In addition, the designer can also interactively browse the data.

The presentation of the state of the search can be text-based or visual. Text-based results can, for example, be a description of the results so far and how they are performing. Typically, however, the results lend themselves well to visual representations, for example, different types of plots including bar chart, histogram and scatter plots. Scatter plots are a compact representation of data with Cartesian coordinates and may be two-dimensional, three-dimensional, etc.

A good visual representation of information can be critical to interpreting and working with the search results. For example, one useful type of display is parallel coordinates in which there is low representational complexity and no information loss by arranging all of the original coordinates in parallel. An example of a parallel coordinates display is given in FIG. 7.

Generally, it should be noted that the parallel coordinates plot is very effective for visualizing circuit data sets because it offers low computational complexity that is O(N) where N is the number of dimensions (variables) represented by the same number of parallel axes. Further reasons are that it works for any N, variables are treated uniformly, and displayed objects can be recognized under projective transformations. This permits multidimensional tradeoff analog circuit data to be represented and visually explored by the parallel-coordinate based visualization to help the designer make better decisions in the complex design process with a timing constraint.

Parallel coordinates display is a technique pioneered in the 1970's which has been applied to a diverse set of multidimensional problems. In this method, each dimension corresponds to an axis, and the N axes are organized as uniformly spaced vertical lines. A data element in N-dimensional space manifests itself as a connected set of points, one on each axis. Points lying on a common line or plane create readily perceived structures in the image. The major limitation of the parallel coordinates technique is that large data sets can cause difficulty in interpretation; as each point generates a line, lots of points can lead to rapid clutter. Also, relationships between adjacent dimensions are easier to perceive than between non-adjacent dimensions. The number of dimensions that can be visualized is fairly large, limited by the horizontal resolution of the screen, although as the axes get closer to each other it becomes more difficult to perceive structure or clusters.

Figure 7:
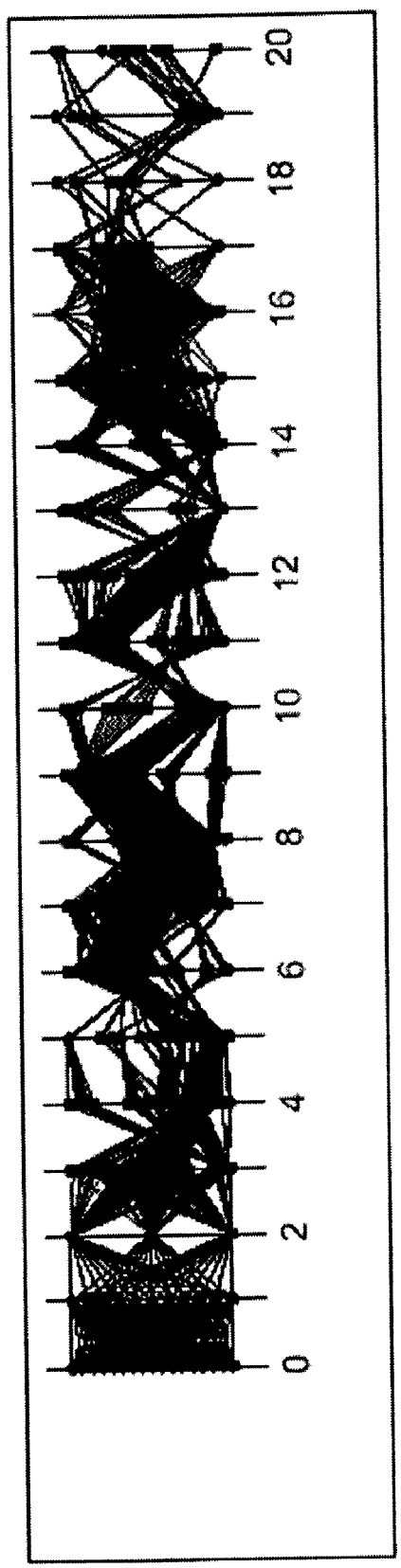
FIG. 7 illustrates an example of parallel coordinates display.

FIG. 7 shows a typical parallel-coordinate display of an analog circuit data set of 561 vectors that consists of 21 dimensions (variables) which are encoded along a horizontal line whereas the corresponding values are specified along the vertical lines. The circuit index, manufacturing index, and operating point index are encoded in the first, second, and third coordinate respectively; metrics are shown from the 4th to the 15th coordinate; random variables from the 16th to the 17th coordinate; and the design variables from the 18th to the 21st coordinate. Together with the use of dynamic brushing of colours (not shown) and glyphs, the designer can easily interact with the information displayed to focus on and to track the behaviours of certain data items. It is also useful in that when some coordinates or vectors are hidden or excluded the designer can easily focus on the data of interest.

Another type of visual representation is a self-organizing map which reduces the dimensionality while attempting to preserve similarities (distances and distribution) in original space. Parallel coordinates are a useful alternative because they have low representational complexity with no information loss by arranging all of the original coordinates in parallel. A dendogram plot shows a view of data organized into a hierarchical tree of clusters (based on distance). Star coordinates can be used to give a compact representation of high dimensional data. A final example is a correlogram in which a matrix of pairs and variables use colours and brightness and ordering of dimensions to show correlations.

The data that is presented or illustrated can be many different types of data or variables. For example, we can show performance such as open loop gain for an operational amplifier. Another possibility is to show design variables such as resistances, transistor widths and lengths. We can also show environmental variables, i.e. the effects of environmental operating conditions such as temperature and power supply. Random variables can also be represented, i.e. the effects of random variations due to manufacturing. Another example is how well constraints are being matched. Finally, data can be shown as a function of time.

The present invention fully contemplates the use of statistical analysis. Some examples of statistics on data that might be useful when the designer interacts with the optimizer include:

hypervolume under tradeoff curve;
hypervolume under a tradeoff curve of lower dimensionality;
rate of growth of hypervolume;
hypervolume versus time;
the total number of simulations or the number of simulations for each testbench;
time related statistics such as total elapsed time or the total sum of simulator time;
coverage such as what percentage of possible design points have been covered;

what percentage of possible design points can be eliminated and need not be covered;

what effective percentage of decent design space remains to be examined;

measures on "flatness of space";

NK-fitness landscape statistics such as roughness and correlation coefficient; and schematic/layout-level views to see design variables' values and to see changes to schematic The biases and problem definitions 510 are updated based on the information presented about the state of the search. Biases include algorithm strategy parameters. The designer uses standard computer input devices to change the biases, for example via mouse, keyboard, spoken, or other computer-input actions on any of the views.

Changing the problem definition includes changing the goals (constraints & objectives) by adding and removing goals, and modifying constraint thresholds (what value of a measurement is needed for the circuit to be feasible). Random variables can be added and removed and the nature of the random distribution and be changed. In addition, environmental variables can be added and removed and corners can be added and removed.

The designer can also change design space, for example, by extending or shrinking the range of design variables. Design variables can be frozen or unfrozen. The designer can add and remove available parts for structural optimization of topologies. The designer can also add and remove design space traversal operators. The designer can incorporate and dis-incorporate design space for other aspects of analog design process, for example, layout and process design. Regions of topology allowed to be tweaked can be frozen and unfrozen. Nodes can be frozen and unfrozen. Construction-based constraints can be added and removed and the design of a substructure can be frozen and unfrozen.

The designer can change biases, for example, by adjusting weights on goals (constraints and objectives) and there can be more than one set of weights for multiple concurrent biases. The designer can also change the preference of orderings of goals.

The designer can change local or global algorithm strategy parameters such as algorithm-specific convergence parameters. Some example conference parameters include the population size for an evolutionary algorithm; temperature for simulated annealing; and minimum step size for generalized pattern search.

The designer can change algorithm stopping conditions so that the algorithm stops after a maximum number of evaluations; after an elapsed time; after a total simulation time; after convergence stagnates according to one of the convergence measures; after all constraints are satisfied; and after all designs are very close and no other likely alternatives remain.

The biases on design space can be changed by biasing towards or away from certain design regions. For example, the designer can locally optimize some designs of interest by restricting the space of local optimization, just some parameters, all parameters that the main algorithm is optimizing, just some structural regions and everything that the main algorithm is optimizing.

The designer can also seed a new design; try to "search around the region" of a particular design; or steer clear of certain design regions or points thought to be "bad".

The present invention allows a designer to manually change a design explicitly (then re-seed or use to bias search in another manner). The present invention also allows a designer to change anything else that an analog or AMS designer normally does manually, the designer could continue to do manually, but then use that as a bias for the search. Examples include: changing design parameters (e.g. via schematic view); adding and removing components in a schematic; and moving around components in (x,y) space of schematic with the optimization engine remembering the locations.

Figure 13:
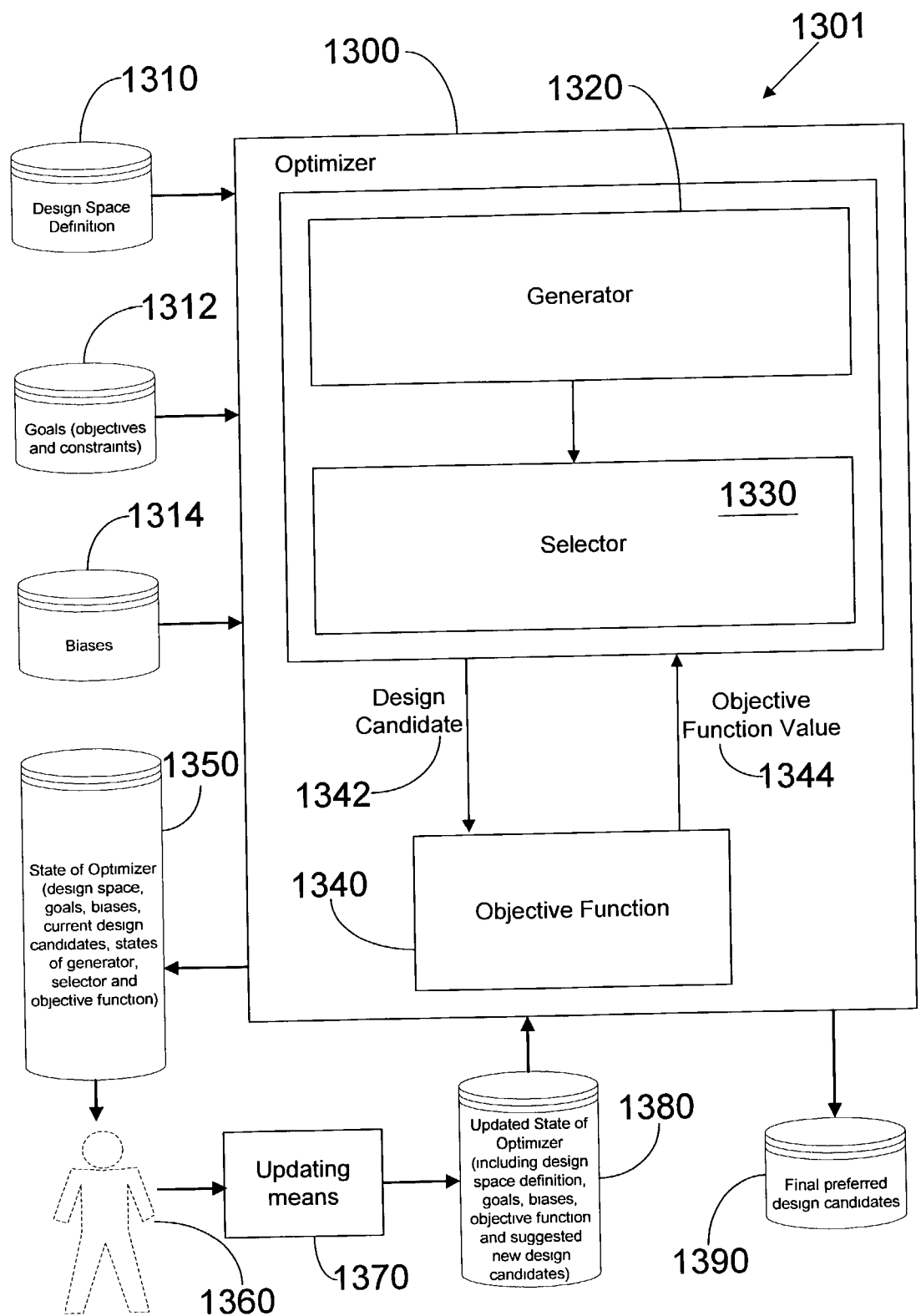
FIG. 13 illustrates a system according to a further embodiment of the present invention.

FIG. 13 illustrates a system 1301 in accordance with another embodiment of the present invention. Referring to FIG. 13, an optimizer 1300 includes a generator 1320 a selector 1330 and an objective value function 1340. The generator 1320 and selector 1330 have access to the objective function 1340 and can invoke the objective function by providing a design candidate 1342 and receiving a corresponding objective function value 1340 for the design candidate. The optimizer 1300 is provided with a definition of design space 1310, goals 1312 (objectives and constraints) and biases 1314. Each of the generator 1320, selector 1330, objective function 1340, design space definition 1310, goals 1312 and biases 1314 are implemented to permit dynamic modification. For example, if the generator generates additional design candidates based on mutation, not only can the statistical distribution of the mutations be dynamically modified by interaction with the designer, but the method of generation itself can be modified from mutation to, for example, crossover. There is typically, although not necessarily an initial set of design candidates (not shown) to seed the optimizer. This can take the form of a set of design candidates specifically selected by a designer or a library of known designs or generated results, for example, from a previous search.

The optimizer runs iteratively to produce successive generations of design candidates and employs the selector 1330 to identify a preferred set of design candidates which is continually being updated. In the present example system, the state of the optimizer 1350 is presented to the designer after updating the preferred set of design candidates. Of course, variations could exist so that the timing of the presentation of the state 1350 of the optimizer 1300 is changed to another point in the optimization process or the frequency could be different, so that the state of the optimizer 1350 is presented after more than one iteration. Alternatively, the state of the optimizer 1350 could be presented more frequently, for example, more than once during an iteration such as before and after updating the set of preferred design candidates.

The expression "state of the optimizer" 1350 generally refers to all aspects of the optimizer which may be useful to the designer in monitoring, evaluating and directing the optimization process including current values associated with and definitions and selection of the design space, the goals of the design problem, its biases, the states of the generator, selector and objective function and corresponding past information. Accordingly, for example, the state of the optimizer 1350 includes not only any weights used by an objective function but also the choice of objective function in the past or any suggested variations of the objective function for future use. Of course, not all information need be presented, not does the same information need to be presented each time. For example, selected aspects of the state of the optimizer 1350 could be presented in response to the activity of the optimizer to highlight progress or the lack of it.

The designer 1360 is given the opportunity to continually monitor the state of the optimizer 1350 which is presented to the designer by presentation means, such as a computer monitor (not shown) and input data using input means (not shown) for use by updating means 1370 to update the state of the optimizer. The updating means 1370 includes software and possibly hardware elements such as memory or registers to modify the state of optimizer in response to input by the designer. For example, if the designer introduces additional design candidates then the set of design candidates is modified by the updating means 1370 to include these additional design candidates. The updated state of the optimizer 1380 can include modifications of any suitable state of the optimizer and can also include new design candidates suggested or introduced by the designer 1360. Of course, input by the designer 1360 is optional. Accordingly, where the designer 1360 is absent or feels that no intervention is necessary, the optimizer 1300 continues without requiring input from the designer 1360, although the state of the optimizer 1350 can, of course, be updated without input from the designer 1360.

Finally, after a stopping criterion is satisfied such as finding a suitable candidate or exceeding some resource limit such as a number of iterations of the optimizer 1300 or the elapse of an amount of time (e.g. 5 hours) a final set of one or more design candidates 1390 is given as the final result.

DETAILED EXAMPLE

Figure 6:
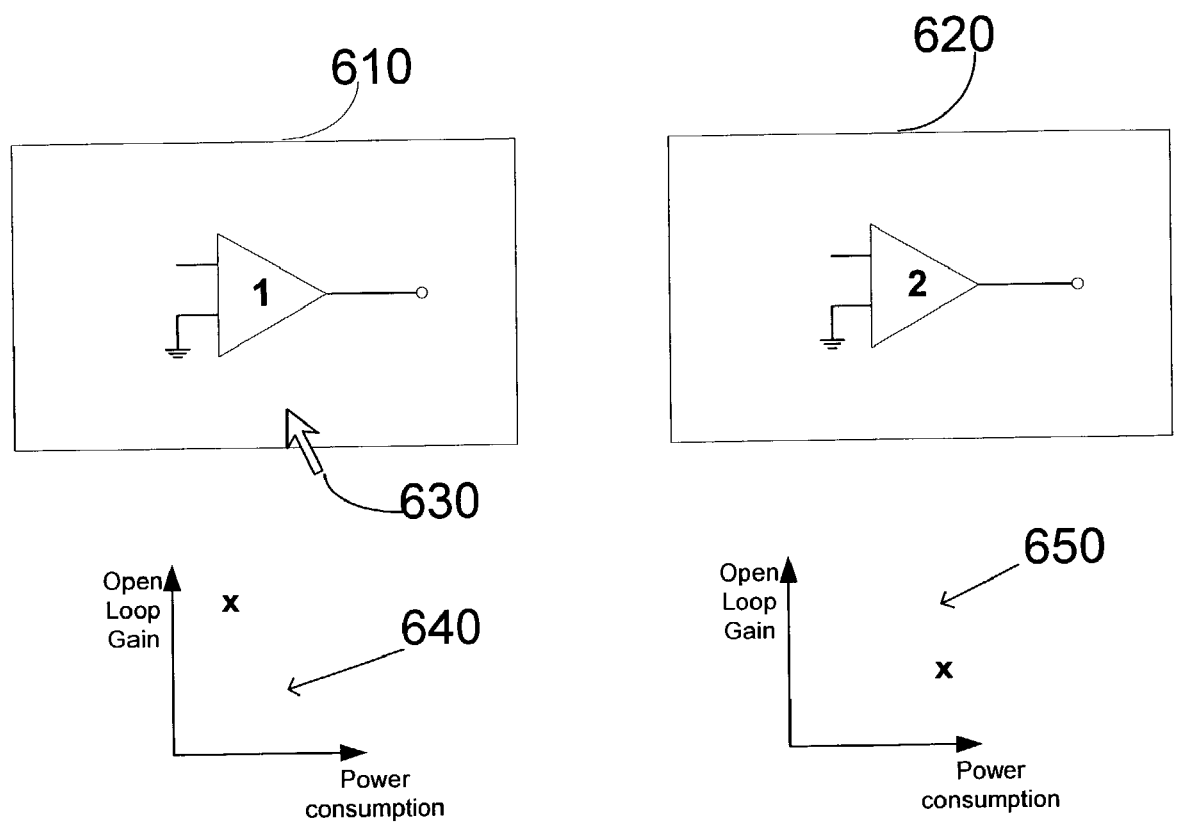
FIG. 6 illustrates an example visual interactive interface.

The present invention will now be described in greater detail with reference to FIGS. 5 and 6 in the context of an example AMS problem in which an operational amplifier is to be designed. The problem definition consists of two goals: a constraint requiring that the opamp have open loop gain greater than 60 dB and the objective that power consumption should be minimized. In addition, the relative importance of these goals can be specified by the use of weights that can, for example, be used to define a single objective function that maps each circuit candidate to a corresponding performance space. In this example, the initial weights are $W_{gain}$=2.0 and $W_{power}$=5.0. These weights form an initial bias for the design problem.

Next, the designer runs a optimization and gets an intermediate result during optimization. The results of the optimization are presented using a visual display such as that illustrated in FIG. 6. FIG. 6 Graphical User Interface that displays to the designer two possible sized topologies and their corresponding coordinates in performance space and enables the designer to choose between this design candidates by using cursor 630.

Reference 610 illustrates a visual representation of a first design of the opamp. The graph 640 is shows the corresponding evaluation of the opamp in performance space, defined by two variables, open loop gain and power consumption. Reference 620 depicts a visual representation of a second design of the opamp. Graph 650 shows the corresponding evaluation of the second opamp in performance space.

Thus, the first candidate design 610 has a position in performance space 640 corresponding to a gain score of 4.0 and a power score of 2.0, whereas the second of design 620 candidate has a position in performance space 650 with a gain score of 3.0 and power score of 4.0. According to this simple example, no other possible choices of biasing exist and an input interface allows the designer to make a choice to bias towards a particular design by simply using a pointing device such as cursor 630 by clicking on one of the two candidate designs. Thus, by clicking on 610 the designer has biased the search to focus more on the first candidate design.

The optimization then continues until stopping conditions are satisfied.

Figure 2:
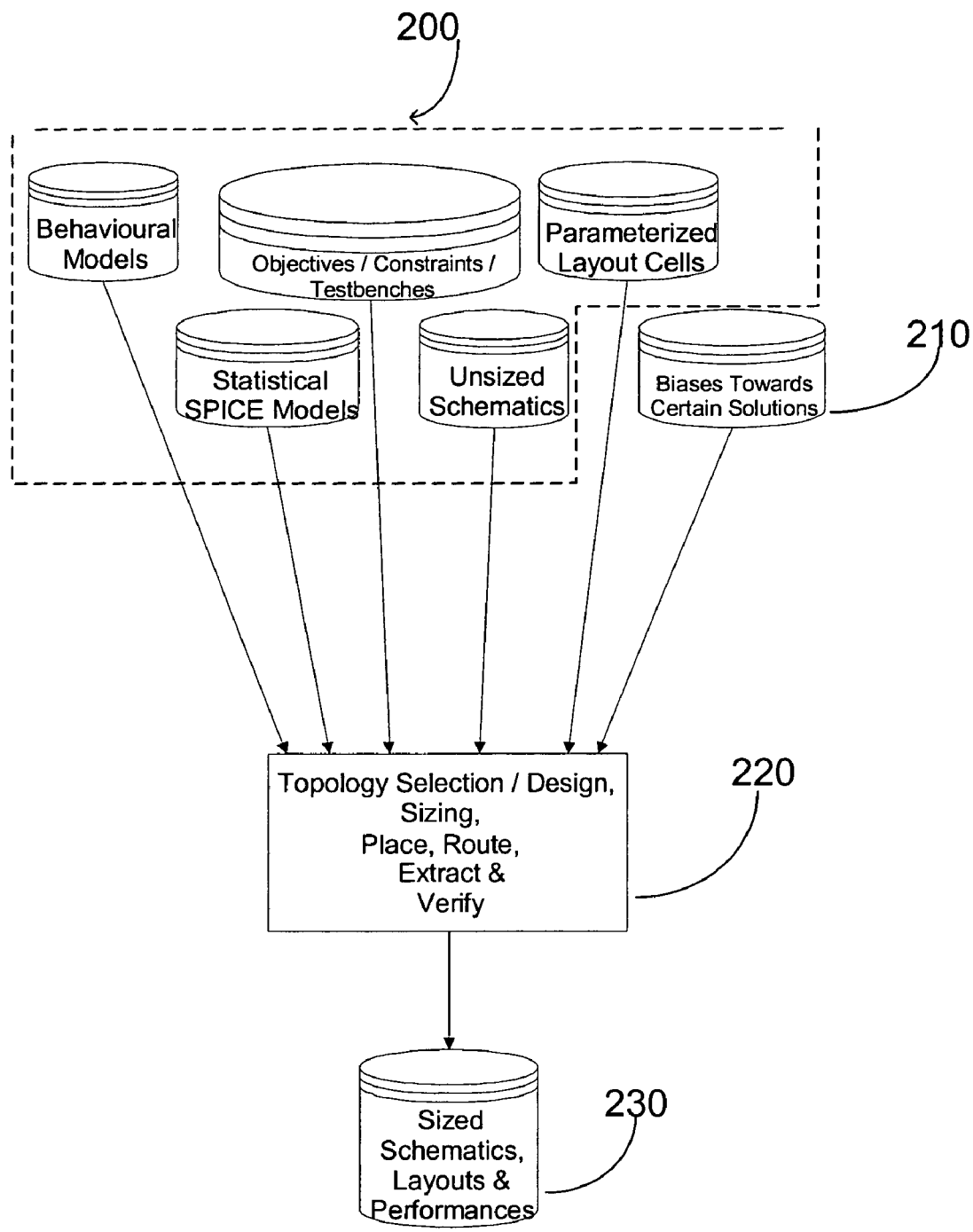
FIG. 2 illustrates a conventional setup of AMS circuit design at one node in a design hierarchy.
Figure 3:
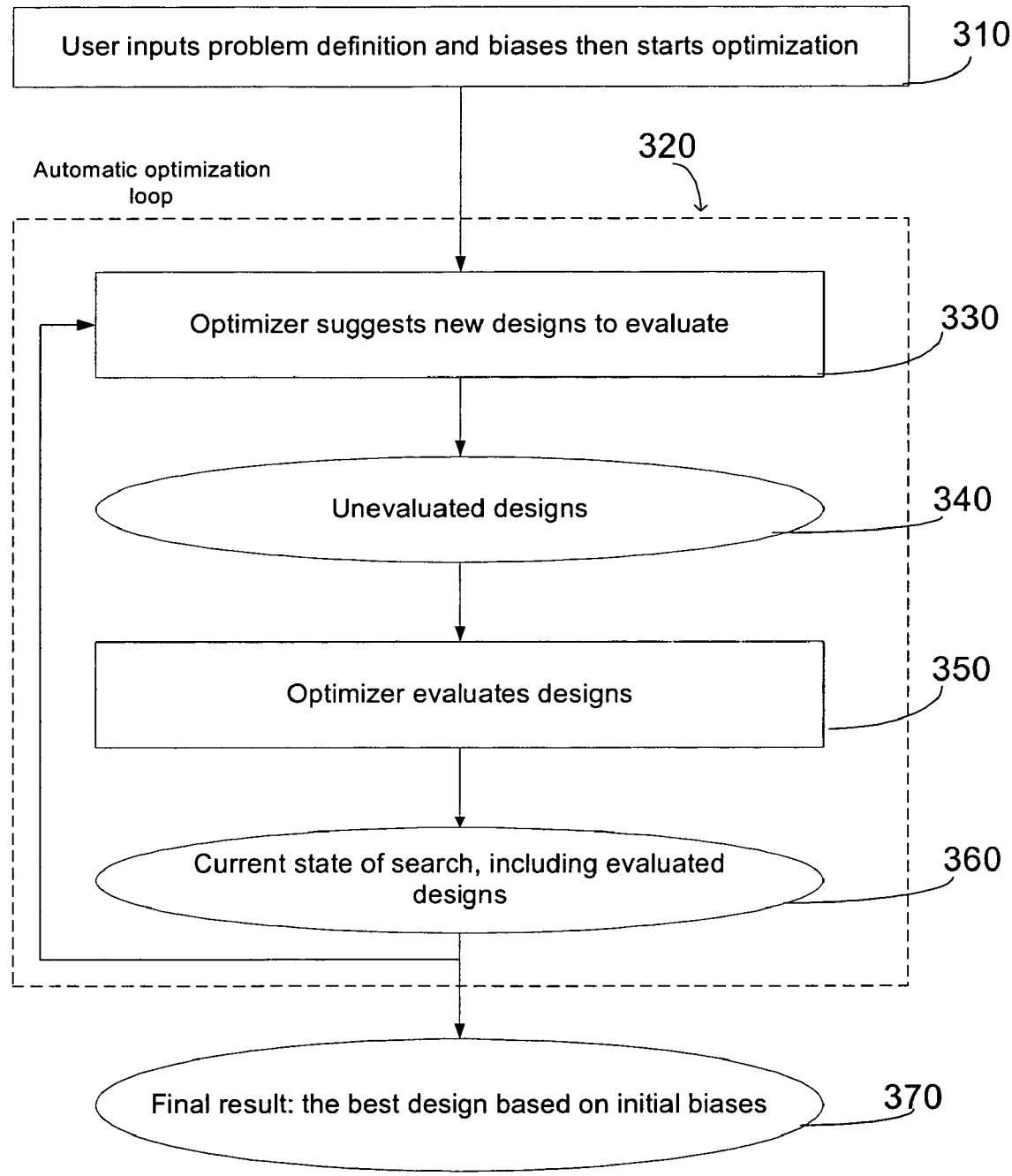
FIG. 3 illustrates a conventional method of a priori optimization.
Figure 4:
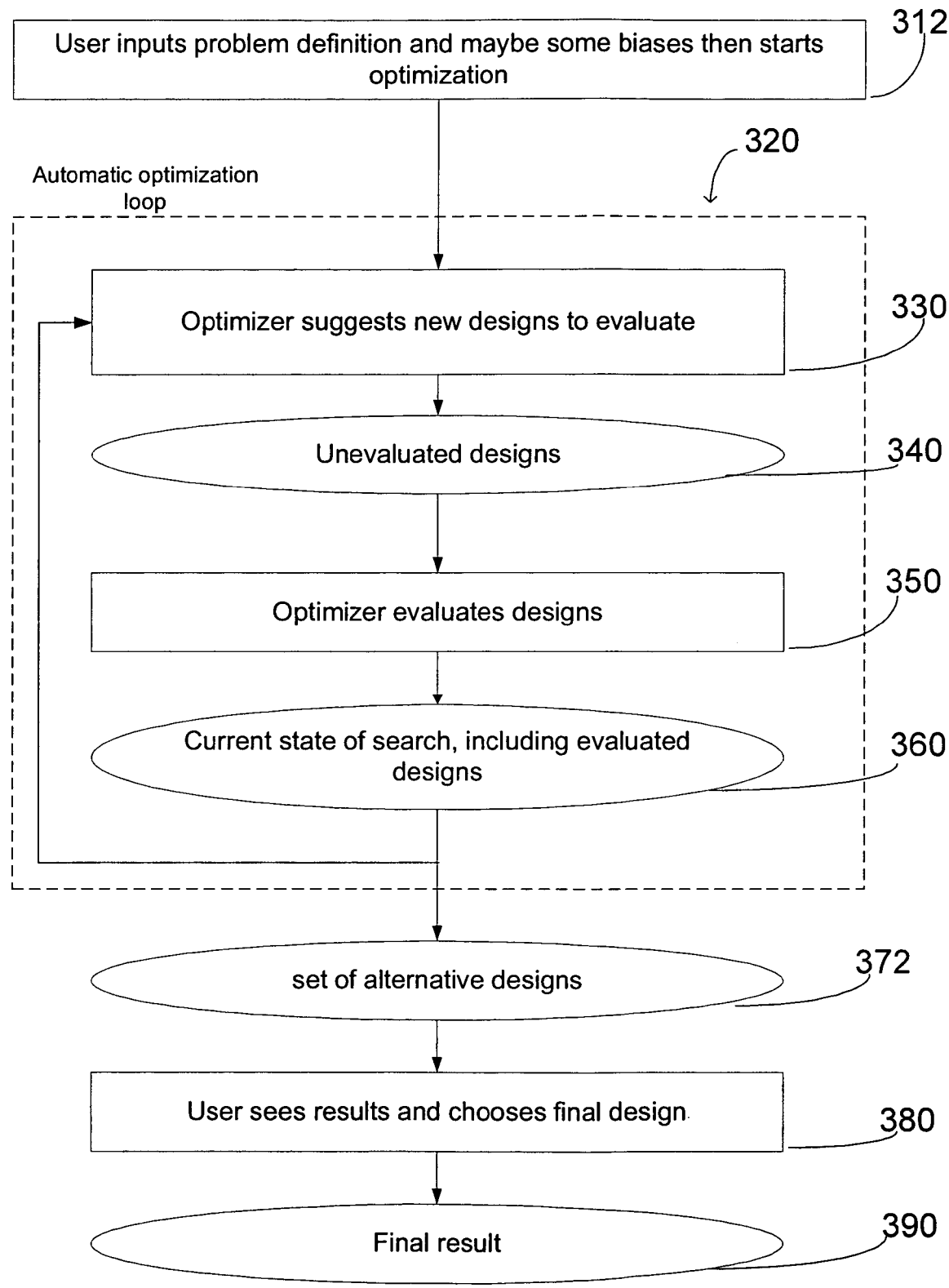
FIG. 4 illustrates a conventional method of a posteriori optimization.

Referring to FIG. 8, implementation of the present invention is not limited to any specific step in the AMS design flow. FIG. 8 illustrates three examples showing different possibilities of where automation may be used, and that automation may include interactivity as described in the present invention. These steps correspond to an implementation of block 220 in FIG. 2.

In the first example, the design and selection of schematics is manual but sizing is automatic. The sizing step is optimized, in accordance with the present invention, by interaction with the designer.

In the second example, schematic selection and design, sizing, placement and routing are all automated followed by automated extraction and manual verification. Schematic selection and design, sizing, placement and routing are implemented together and the optimization of the results is interactively guided with input from the designer.

In the third example, schematic design and selection are automated along with sizing. Placement and routing are done manually. Extraction is automated followed by manual verification. The present invention allows the designer to interactively guide the combined step of schematic design and selection, and sizing.

The above-described embodiments of the present invention are intended to be examples only. The present invention has been discussed in the context of AMS systems but could also apply to other areas of EDA such as analog systems or digital systems.

In addition, it is fully contemplated that the method of the present invention can have broader applications outside these examples.

For example, consider an op amp schematic design problem, which the designer sets up as follows. There are two goals; two objectives in this example. One goal is maximize open loop gain; the other goal is to minimize power consumption. The relative importance of the goals remained unspecified; therefore there is no initial bias. The initial design consists of one initial opamp schematic topology with structural changes allowed, plus all the parameters of all the components of the topology.

The designer then starts the optimization run, and begins to get intermediate results. The designer immediately sees that the best performing results are behaving with unreasonably low slew rates. So, during the optimization the designer adds the goal of maximizing slew rate.

The designer then sees that capacitors are added to the op amp inputs, which is undesirable as this greatly affects input impedance. The designer wishes to add an input impedance constraint, but realises no new components can be allowed to touch the opamp input. So, within the schematic viewer, the designer right-clicks on one of the opamp schematic's input node, to access a pull-down menu, and disables changes to the node by selecting a suitable option. The designer repeats for the other node.

The designer allows the optimization to continue to run and watches as the engine adds components and present successful new circuits. The parallel coordinates plot shows that two new circuits have significantly improved gain, at a cost in power consumption. One circuit has gain about as good as the original circuit, but very lower power consumption and high slew rate. This circuit is highly desirable so the designer emphasizes it by, for example, using a pull-down menu and selecting "emphasize candidate design in search." Within minutes many variants of that design are presented. Subsequently the designer sees a design with performance measures that is quite satisfactory. The designer examines the topology and likes it. The designer stops the run, intending to use the topology just viewed as the final result.

A second example is an opamp schematic and layout design problem, which the designer sets up as follows. The designer's schematic/layout tools work with a single database to present the circuit schematic and the layout as two different views of the same data.

The designer selects a topology and sets all the parameters to be designable, and the structure itself to be designable too. The designer sets up 30 design goals and uses the layout tool's facility to randomly generate a layout from the topology. The designer then sets up both the placement and the routing to be designable and sets up an additional 20 design goals.

The designer then starts the optimization, and begins to get intermediate results which indicate that the design rules for the placement are not being followed very well. In response the designer increases the weights on the goals related to meeting design rules.

The engine proposes a particular routing that scores very well, however, the designer dislikes it, so the designer biases away from it by, for example, right clicking on the layout to get a pull-down menu and selecting the item "steer clear of this design."

Then the designer sees that the placement is taking shape quite nicely, but that the optimizer is missing some great routes that the designer finds obvious. So, the designer takes a design, manually reroutes it, and submits this candidate design back to the search. Within minutes, the designer gets a report on how well the design did: it is doing well since it is on the performance trade-off curve among circuits. It had a fair, but not best, weighted sum. The designer then increases the weights of goals related to placement and looks at the new weighted-sum ranking. This design is on the top of the list. To ensure that the manual route is maintained during the rest of the optimization, the designer right-clicks on the manual route and selects "freeze route" from a pull-down menu.

The designer watches the schematics and layouts get dynamically optimized with goal measures increasing over time. The designer looks at the schematic of the circuit with the best weighted sum and sees that a few changes have been automatically made to the topology. The designer has an idea, and decides to carry it out. The designer takes the schematic, manually removes a particular transistor, and adds a capacitor elsewhere and submits that design. In a few minutes, the results indicate that the circuit has terrible performance, thereby eliminating that idea as a viable one. Because of the large design space, it might have taken hours or even days for the optimizer to come up with an idea this good.

The designer is able to leave for the day but let the optimizer run overnight. If the designer shares computing resources, the designer can set stopping conditions so that other people get resources as soon as the optimization is finished. For example, the stopping condition can be satisfied when a certain set of specifications have been met. The designer can be confident of the stopping condition because the interactive process has given the designer an idea of the progress that has already been made.

Later, for example the next day, when the designer returns, the optimizer presents, for example, on a visual display one or more designs that meet the specifications established by the designer earlier.

Figure 9:
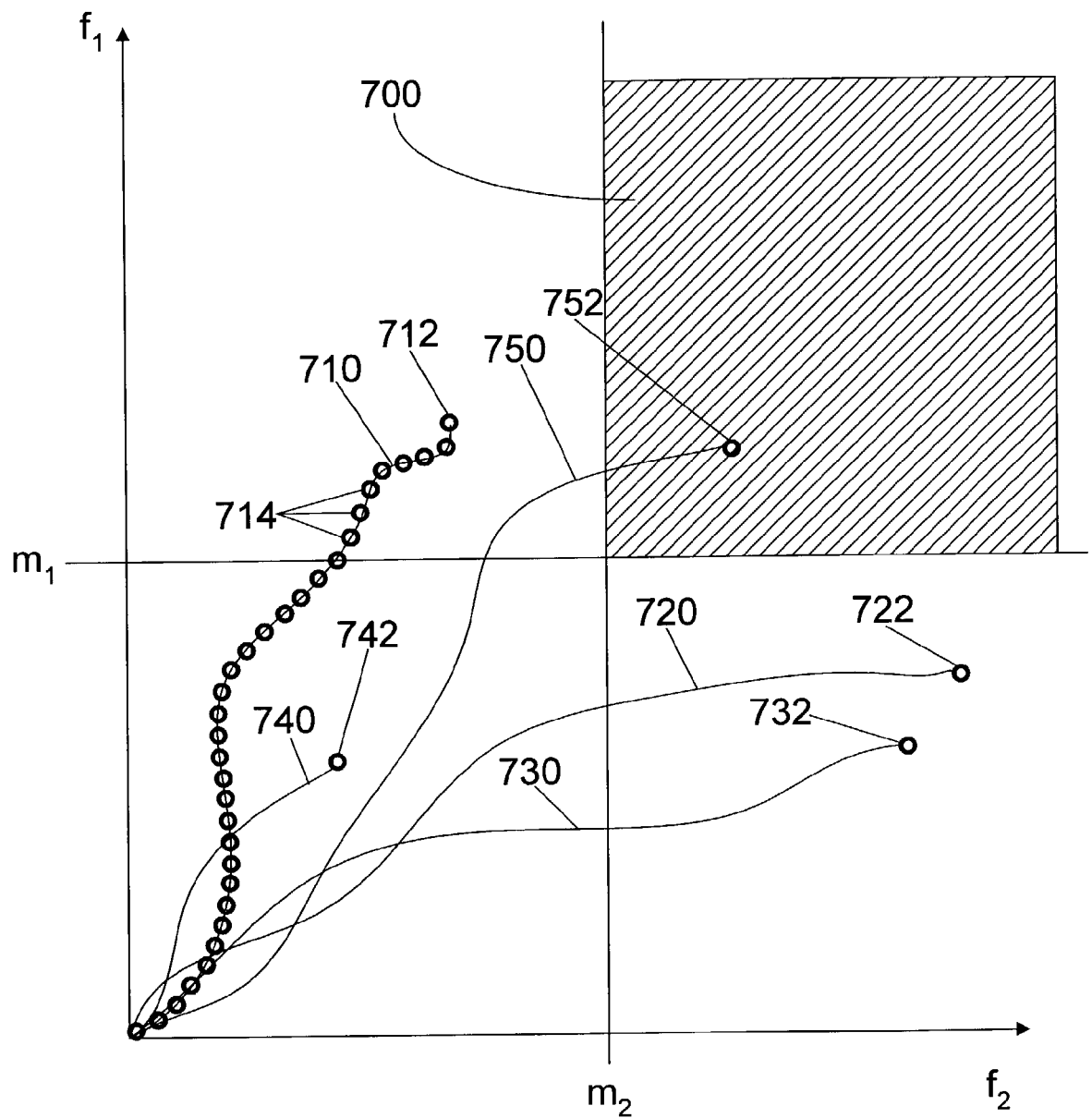
FIG. 9 illustrates the results of a design/optimization using a conventional method.

The advantages of the present invention are dramatically illustrated by the results illustrated in FIGS. 9 to 12. FIG. 9 illustrates the search for solutions of a design problem using a conventional optimizer and a conventional method. The optimizer is not interactive and its behaviour and criteria and fixed and predetermined before each run. The case can be documented as follows:

1) Set up problem definition, including constraints;
2) Set weights (i.e. form biases) to convert vector valued objective function to a scalar value;
3) Run a whole optimization;
4) Examine results;
5) If satisfied with results, stop; otherwise
6) Change weights and constraints and go to 3).

Referring to FIG. 9, the design problem has goalsand is constrained by m1 and m2 so that only design candidates in the region 700 are acceptable. A typical case using conventional methods requires more than three optimization runs to produce an acceptable solution. There are five runs shown in FIG. 9, namely 710, 720, 730, 740 and 750. In this example, the first run 710 produces result 712 which is the final search result for the optimization run. Intermediate results or intermediate generations 714 as also shown for the first run 710. Similarly, the second run 720 produces (final) result 722, the third run 730 produces result 732, the fourth run 740 produces result 742 and the fifth run 750 produces result 752. The intermediate generations for runs two to five have been omitted from FIG. 9. Assuming that there are approximately 100 generations per run, the total amount of effort and resources expended to find the acceptable design candidate 752 is 500 generations. Note that conventional methods rely on a trial and error process of generating results by conducting optimization runs and then assessing the result of the optimization run and repeating as required. The lack of interactivity both in procedure and the implementation of an optimizer in hardware and software is responsible for the wasteful consumption of resources compared with the results produced by the present invention.

Figure 10:
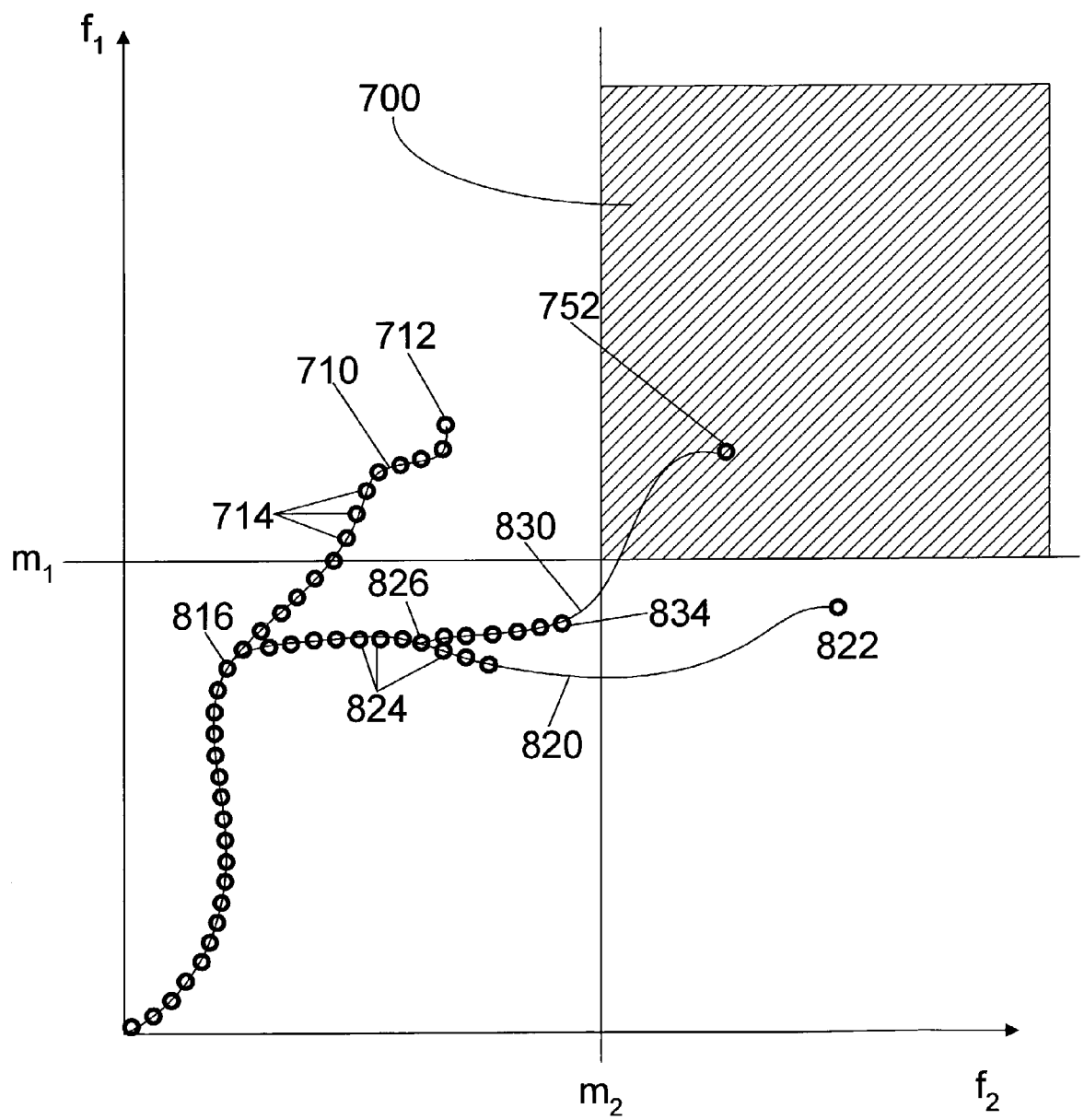
FIG. 10 illustrates the results of a design/optimization using a method according to an embodiment of present invention.

FIG. 10 illustrates the results of the same problem using the present invention. The corresponding case statement can be documented as follows:

1) Set up problem definition, including constraints;
2) Set weights (i.e. form biases) to convert vector valued objective function to a scalar value;
3) Run optimization;
4) Interactively provide feedback to designer on state of optimizer
5) Let designer update bias and problem definition and suggest new designs as desired.
6) If satisfied with results, stop; otherwise go to 4)

Note that the same acceptable design candidate 752 is identified, however, much less effort and resources are required. FIG. 10 shows three partial runs denoted 710, 820 and 830. The first partial run 710 is the same as run 710 in FIG. 9. During partial run 710 the designer analyzes intermediate designs and realizes that intermediate result 816 is good. When the designer sees that partial run 710 has stagnated at result 712, the designer interactively modifies the state of the search to emphasize improving result 816, and a subsequent partial run 820 arises.

Partial run 820 continues until stagnation at result 822. Once again, the designer is ready with an intermediate result 826 to start partial run 830.

Assuming that the first partial run 710 requires 100 generations, second partial run 820 requires 60 generations and third partial run 830 requires 50 generations, the same result is obtained using with the present invention in 210 generations compared to 500 generations.

Figure 11:
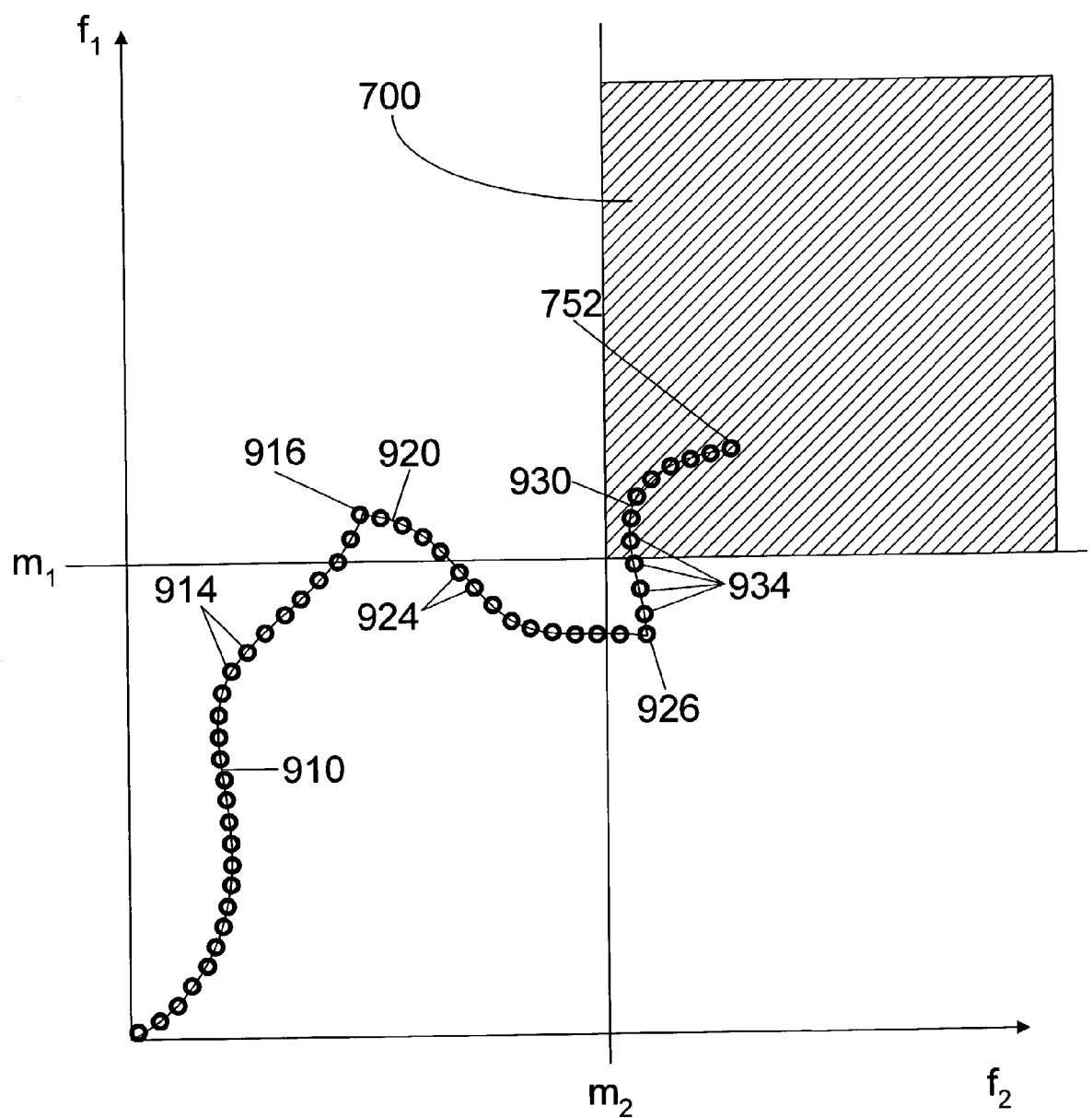
FIG. 11 illustrates the results of a design/optimization using a method according to another embodiment the present invention.

Referring to FIG. 11, an alternative embodiment of the present invention is depicted which better illustrates the advantages of the present invention. Here the results of the run are dynamically assessed and the optimization is steered or guided based on input from the designer. The emphasis is on interactively changing weights on goals rather than changing emphases on specific design candidates. In the example of FIG. 11, there is only one single run having three segments 910, 920 and 930 resulting in the same final result 752. However, according to the method of FIG. 5, the designer continually monitors the results of each generation or iteration of the optimizer and can affect the process by changing the problem definition, goals, biases or any other aspect of the state of the optimizer. The designer allows the optimizer to run along segment 910 until it reaches the result identified as 916. Upon examination of the state of the search at this point, the designer introduces input to the optimizer causing the search to change direction, by interactively increasing the emphasis on goal $f_2$. The process then continues along the segment 920 with intermediate results depicted as 924. This continues, with the designer continuing to monitor the state of the search but not otherwise intervening until the result 926 is reached. At this point, the designer re-biases the weights, now towards goal $f_1$, causing the optimization to progress along the path shown by segment 930 with intermediate results 934. The designer is satisfied with the final result 752 which is found without further intervention by the designer. If we estimate segment 910 as having 90 generations, segment 920 as having 40 generations and segment 930 as having 30 generations, then the result 752 is found using the resources and effort needed to explore 160 generations compared with 500 generations according to the conventional procedure. Although the comparison in terms of generations may not be precise, it does provide an approximate proxy to the savings in resources which may be realized using the present invention.

Figure 12:
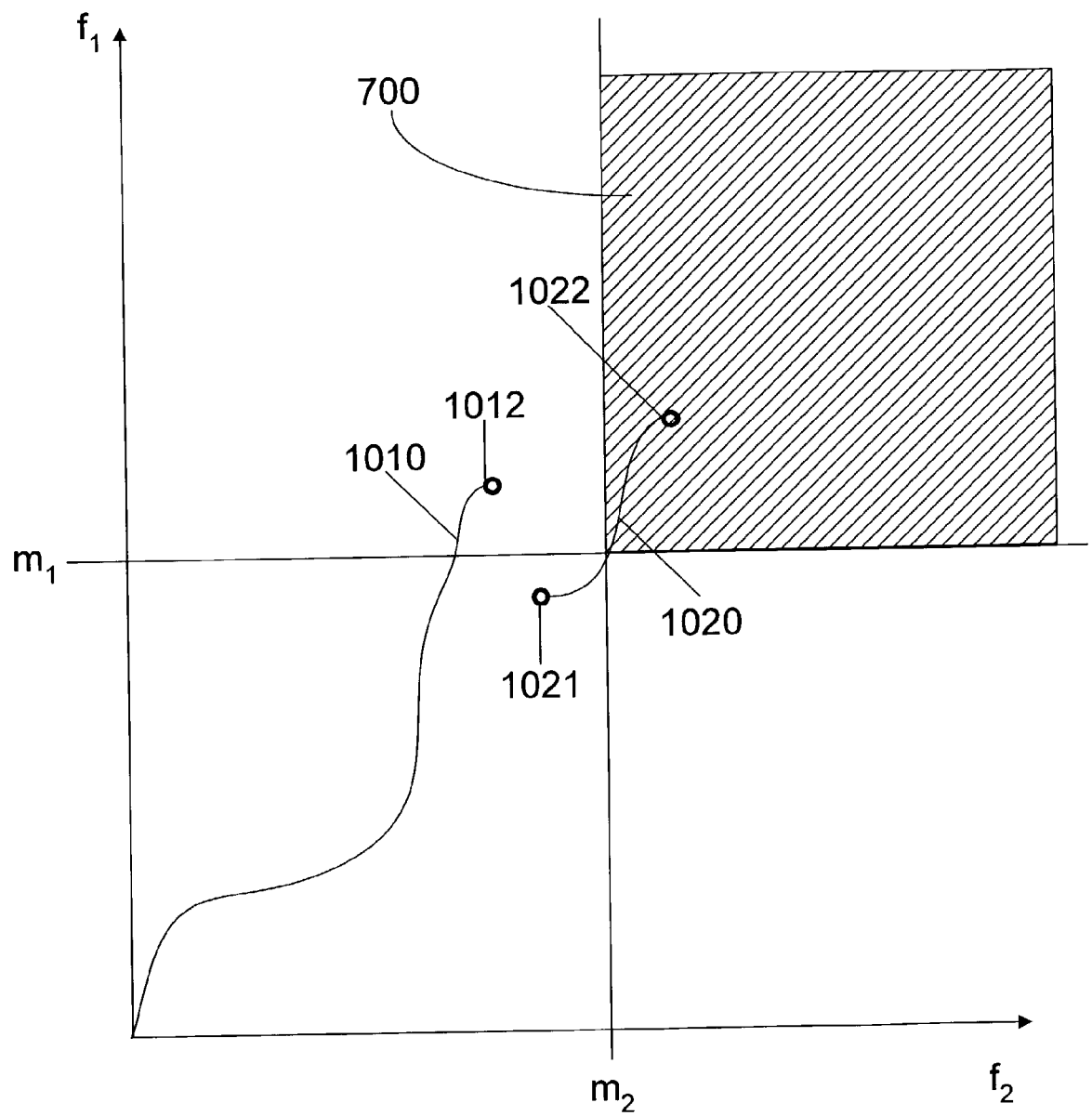
FIG. 12 illustrates the results of a design/optimzation using a method according a further embodiment of the present invention.

Referring to FIG. 12, as an alternative embodiment, the designer can monitor the progress of the run 1010 until it reaches result 1012. The designer then intervenes and, for example, introduces a new design candidate from which to continue the optimization 1021. The optimization then continues along segment 1020 until the final acceptable result 1022 is achieved. This is even more efficient than the previous embodiments, achieving success in perhaps 100 generations or iterations.

These results agree with the type of improvement one can expect. For example there are on the order of 200,000 ways to add a transistor in parallel to a 40 transistor circuit. Structural optimization may take a long time to get good improvement, whereas a designer can leverage experience to prune or eliminate dead ends and restrict further exploration to the most promising candidates.

Although the present invention is presented in the context of circuit design example, method of the present invention is applicable to many other types of design problems including, for example, design problems relating to digital circuits, scheduling, chemical processing, control systems, neural networks, regression modelling unknown systems, molecular synthesis, optical circuits, photonics, communications networks, sensors and flow network design problems such as road systems, waterways and other large scale physical networks, optics, mechanical components and opto-electrical components.

Embodiments of the present invention can be implemented as a computer-readable program product, or part of a computer-readable program product, for distribution or integration in suitable software and hardware systems. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art will appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer-readable program product may be distributed as a removable medium with accompanying printed or electronic documentation (e.g., shrink-wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer-readable program product) and hardware. Still other embodiments of the invention may be implemented as entirely hardware, or entirely software (e.g., a computer-readable program product).

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Alterations, modifications and variations may be effected to the particular embodiments by those of skill in the art without departing from the scope of the invention, which is defined solely by the claims appended hereto.

I claim:

1. A method of interactively performing design optimization using an optimizer, the optimizer having a generation algorithm and an objective function, the method comprising:

generating a set of design candidates by applying the generation algorithm to a set of initial design candidates;

evaluating the set of design candidates by applying the objective function to the set of design candidates to generate an objective function value for each of the set of design candidates;

selecting from the set of design candidates a preferred set of design candidates based on the objective function value for each of the set of design candidates;

providing an indication of a current state of the optimizer in a user-readable format;

updating the current state of the optimizer according to a user input if the user input is received in response to the indication of the current state of the optimizer;

defining the preferred set of design candidates as the set of initial design candidates; and iteratively repeating the steps of generating, evaluating, selecting, providing, updating, and defining until a stopping criterion is satisfied, wherein updating the current state of the optimizer comprises at least one of:
  adding a user design candidate to the set of design candidates;
  adjusting one or more biases for the design problem definition;
  adjusting the generation algorithm;
  adjusting the objective function; and
  adjusting the stopping criterion.

2. The method of claim 1 wherein the design optimization is performed to solve an electronic circuit design problem.

3. The method of claim 2, wherein the circuit is one of: an analog circuit, an RF circuit, a mixed-signal circuit and a digital circuit.

4. The method of claim 1, further comprising:
  identifying a final set of search results after the stopping criterion is satisfied, the final set of search results including at least one of the set of design candidates; and
  selecting one of the final set of search results as an optimized design.

5. The method of claim 1, wherein the indication of the current state of the optimizer comprises at least one of:
  a tradeoff curve of one or more design candidates;
  a parallel coordinates plot of optimization results;
  a self-organizing map of optimization results;
  a dendrogram plot of optimization results;
  a star coordinates plot of optimization results; and
  a correlogram of optimization results.

6. The method of claim 1, wherein providing the indication of the current state of the optimizer comprises providing the indication of the current state of the optimizer at each iteration.

7. An optimizer for interactively performing design optimization to solve a design problem, the optimizer comprising:
  a generator for generating a set of evaluation design candidates by applying a generation algorithm to a set of initial design candidates;
  a selector for applying an objective function to the set of evaluation design candidates to select a set of preferred design candidates from the set of evaluation design candidates;
  presentation means for presenting a state of the optimizer in a user-readable format;
  updating means for receiving an input in response to the state of the optimizer and for updating the state of the optimizer based on the input; and
  control means for iteratively operating the optimizer until a stopping condition is satisfied,
  wherein updating the current state of the optimizer comprises at least one of:
    adding a user design candidate to the set of evaluation design candidates;
    adjusting one or more biases for the design problem;
    adjusting the generation algorithm;
    adjusting the objective function; and
    adjusting the stopping criterion.

8. A method of performing design optimization, the method comprising:
  providing a set of initial design candidates to an optimizer;
  applying a generation algorithm in the optimizer to the set of initial design candidates to generate a set of generated design candidates;
  combining the set of initial design candidates with the set of generated design candidates to create a set of evaluation design candidates;
  identifying a set of preferred design candidates from the set of evaluation design candidates by applying an objective function in the optimizer to the set of evaluation design candidates;
  generating an indication of a current state of the optimizer in a user-readable format;
  adjusting the current state of the optimizer based on a user input if the user input is received in response to the indication of the current state of the optimizer;
  setting the set of preferred design candidates as the set of initial design candidates; and
  repeating the steps of applying, combining, identifying, generating, adjusting, and setting until the current state of the optimizer satisfies a stopping condition.

9. The method of claim 8, wherein updating the current state of the optimizer comprises at least one of:
  adding a user design candidate to the set of preferred design candidates;
  adjusting the generation algorithm;
  adjusting the objective function; and
  adjusting the stopping condition.

* * * * *